J. M. A. FAURE.
APPARATUS FOR MANUFACTURING PLATES, &c.
APPLICATION FILED MAR. 6, 1914.
1,247,384. Patented Nov. 20, 1917.
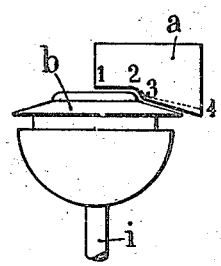
Fig.1.
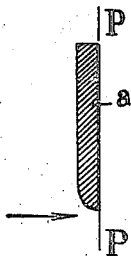
Fig.2.
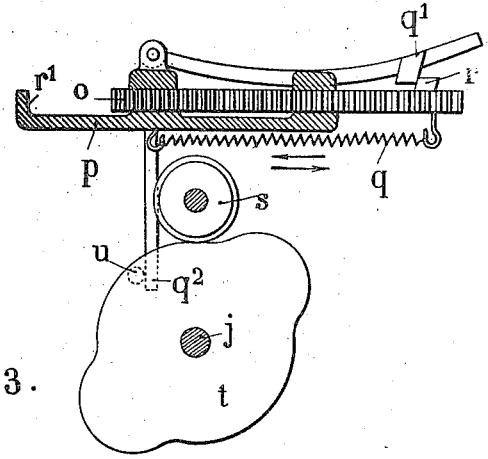
Fig.4.
Fig.3.
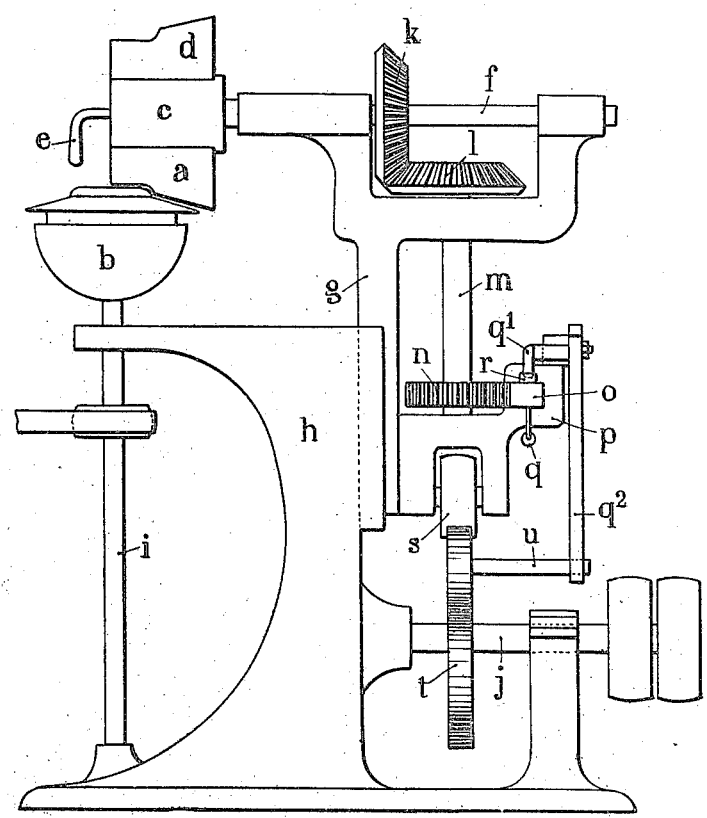
WITNESSES
INVENTOR
JEAN MARIE ANDRÉ FAURE
BY
ATTORNEYS

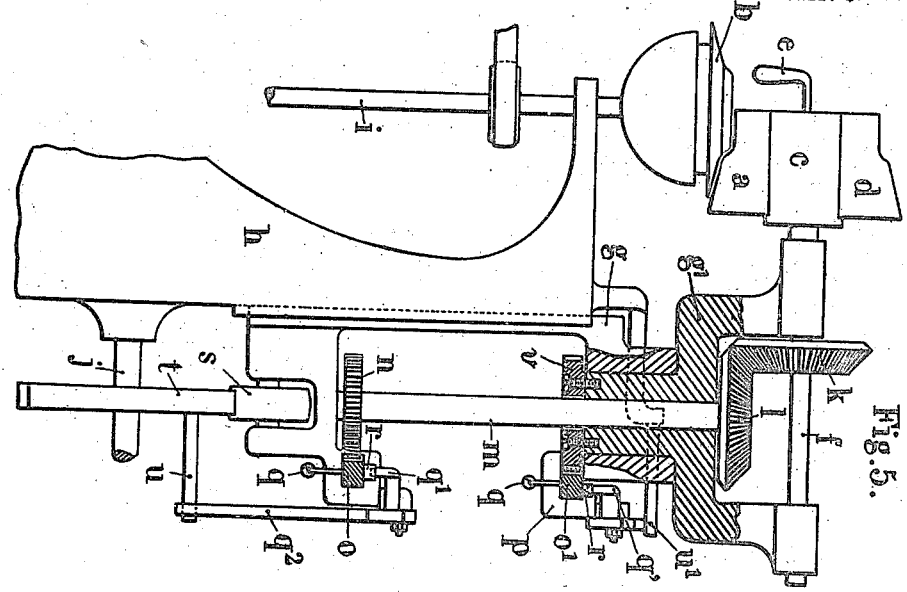
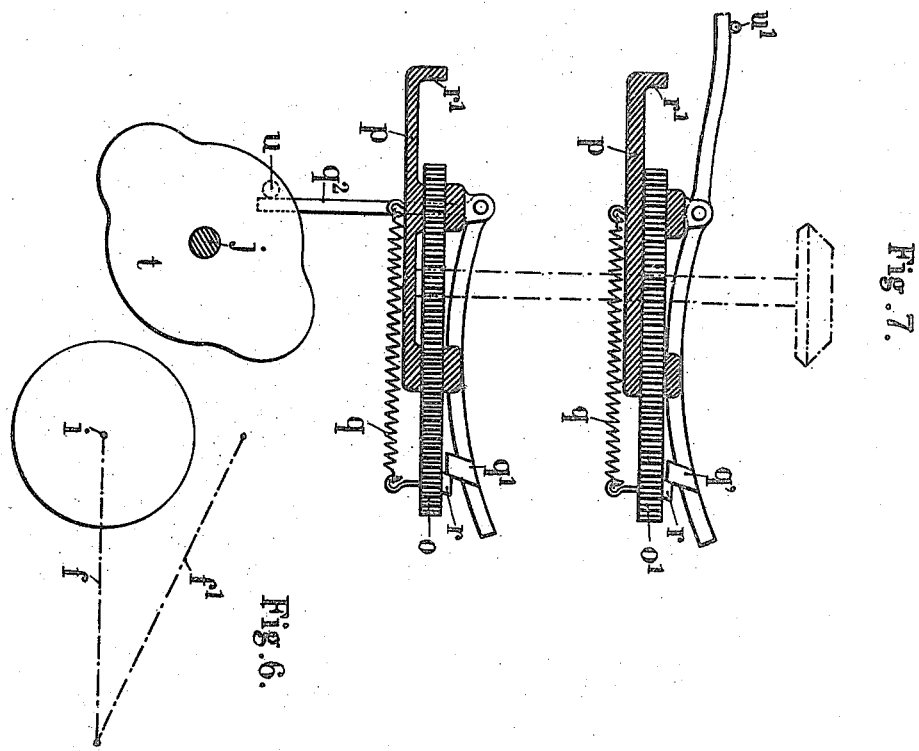

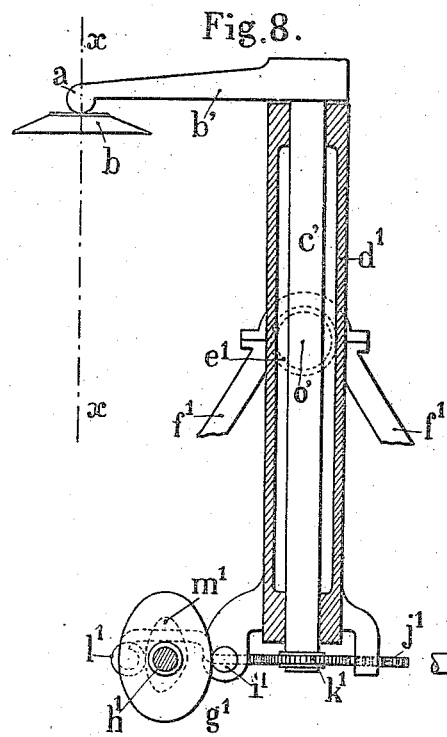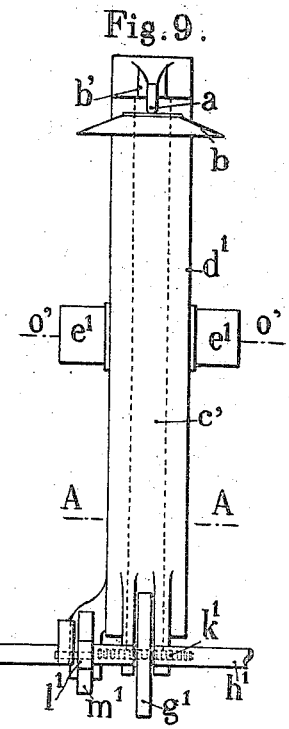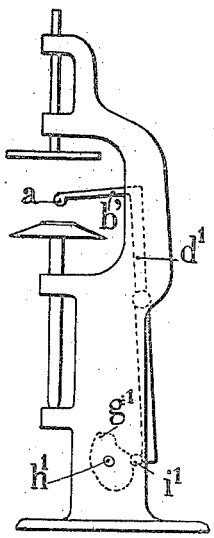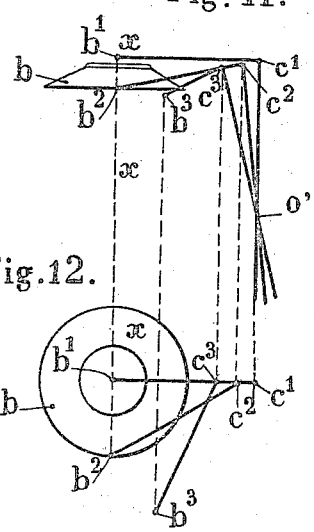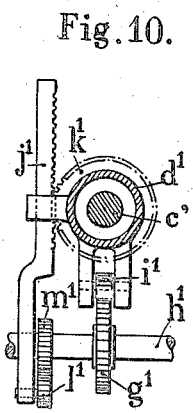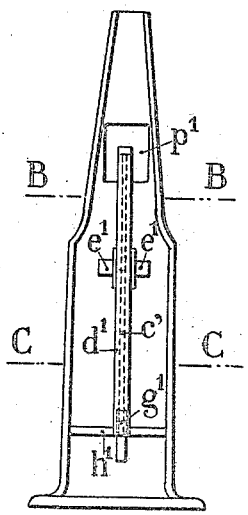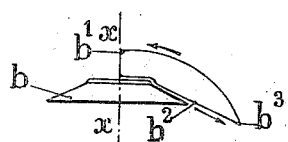

UNITED STATES PATENT OFFICE.

JEAN MARIE ANDRÉ FAURE, OF LIMOGES, FRANCE.

APPARATUS FOR MANUFACTURING PLATES, &c.

1,247,384. Specification of Letters Patent. Patented Nov. 20, 1917.

Application filed March 6, 1914. Serial No. 822,919.

*To all whom it may concern:*

Be it known that I, JEAN MARIE ANDRÉ FAURE, of 21 Place du Champ de Foire, Limoges, Haute-Vienne, France, have invented an Improved Apparatus for Manufacturing Plates, &c., of which the following is a full, clear, and exact description.

The invention is shown by way of example in the annexed drawings in which:

Figure 1 is an elevation of the molding tool and Fig. 2 a cross section thereof drawn to a larger scale.

Fig. 3 is an elevation of the machine, while Fig. 4 is a side view corresponding to the latter and illustrates a portion of the machine.

Fig. 5 relates to a modified construction.

Fig. 6 is a corresponding diagrammatic plan view.

Fig. 7 is a partial side view corresponding to Fig. 6.

Fig. 8 is a vertical section of a modified form of the machine.

Fig. 9 is a corresponding side view.

Fig. 10 is a horizontal section on the line A—A, Fig. 9.

Figs. 11, 12 and 13 illustrate diagrammatically the working of the machine.

Figs. 14 and 15 illustrate in elevation and in side view the employment of this device on a lathe of the type usually employed for centering and pressing the layers of clay on the molds.

Figs. 16 and 17 are two sections on lines B—B and C—C of Fig. 15.

The molding tool shown in Figs. 1 and 2 is constituted by a sheet $a$ of hard wood, steel, gunmetal or other suitable hard substance of a thickness, for example, of two to four centimeters. This sheet is cut away according to a profile 1, 2, 3, 4 obtained by tracing at a distance from the mold $b$ equal to the thickness which the blank is to have after molding, a line parallel to the half profile of this mold.

It is preferable to give to that part of the tool which is in front of the periphery of the mold, a slight progressive cut-away shape as indicated by the dotted line.

The tool is rounded off as shown in Fig. 2 so that the blank or sheet of clay shall engage beneath the tool and that a downwardly directed pressure shall be produced causing the application of the blank against the mold and its adherence thereto.

The plane on which the profile 1, 2, 3, 4 is drawn passes through the axis of rotation of the mold at the time when the application takes place and the point 1 is on this axis.

The movement of applying this tool to the blank is such that during this application the different points of the profile 1, 2, 3, 4 move normally to the plane P (Fig. 2) in which the profile is traced.

These two conditions, however, are not absolute. Owing to the plasticity of the clay the tool may be constituted and moved in a slightly different manner. It should be noted that owing to the rotary movement all points of the blank which are on the same circle are submitted to the same operations, this permitting the conditions above set forth to be departed from more or less according to circumstances.

This molding tool is carried by a turret-head $c$ (Fig. 3) on which is also mounted a gage $d$. This turret head is furnished with a handle $e$ and is secured on a spindle $f$ adapted to rotate in bearings on a frame $g$ capable of sliding vertically in a stationary base $h$ which carries the shaft $i$ supporting the mold $b$ and a horizontal shaft $j$ driven in any suitable manner.

On the spindle $f$ is secured a bevel wheel $k$ meshing with another bevel wheel $l$ mounted on a shaft $m$.

This shaft $m$ carries a pinion $n$ engaging with a rack $o$ adapted to slide in a groove $p$ and provided with a spring $q$. A pivotally mounted stop $q^1$ serves to retain this rack in the set position. The frame $g$ rests by a roller $s$ on a cam $t$ keyed to the shaft $j$.

The operation is as follows:

The operator, having placed the mold $b$ carrying the clay blank to be molded on the shaft $i$, manipulates the handle $e$ so as to bring the molding tool $a$ toward the mold. By rotating the spindle $f$ the concurrent rotation of the shaft $m$ and pinion $n$ is brought about thus moving the rack $o$ in its slide and putting the spring $q$ under stress. The stop $q^1$ engages behind a stop $r$ carried by the rack when the latter reaches its extreme position and retains it, at which time the molding tool occupies its working position.

As soon as the molding operation has been completed the frame rises slightly and the tool is removed from the clay. At this moment a stop $u$ carried, for example, by the cam $t$, comes up against an extension $q^2$ on the stop $q^1$ and raises the latter. The rack is drawn back by its spring and rotates the shaft $m$ and spindle $f$. The turret head $c$ revolves half a revolution thus bringing the calibrating tool above the blank. The rack coming up against the stop $r^1$ occupies a definite position and the calibrating tool assumes its precise working position.

The cam $t$ then allows the frame $g$ to again descend; the calibration then takes place and the frame rises once more.

The work on the blank being then completed, the mold is removed and replaced by another also carrying a clay blank which is then treated in the same manner as the first.

Fig. 5 illustrates a modified construction of machine which permits the freeing of the upper part of the shaft $i$ between two operations. In this case the sliding frame is made in two parts. The lower portion $g$ is mounted to slide vertically as before, and the upper part $g^1$ to rotate in the part $g$ concentrically with the shaft $m$. The portion $g^1$ carries spur gearing $v$ engaging with a rack $o^1$ arranged in the same manner as the rack $o$ and provided with similar locking and stopping mechanism. The operation in this case is as follows:

Assuming that after a molding and calibrating operation the portion $g^1$ has been rotated to free the head of the lathe and that the spindle $f$ has assumed the position $f^1$ (Fig. 6); the operator having placed another mold in position, draws toward him the handle $e$ to bring the head $o$ above the mold. During this movement he brings about the partial rotation of the portion $g^1$ of the frame and sets the rack $o^1$. At the same time he sets the rack $o$ for, inasmuch as the shaft $f$ cannot rotate inasmuch as the operator holds the handle $e$, the shaft $f$ causes the rotation of the shaft $m$ and pinion $n$. As will be seen, a single pull on the handle is sufficient to set both racks. The molding is carried out as above described. As soon as it is finished the finger $u$ sets free the rack $o$ and a gage is substituted for the molding tool. When the calibration has been completed the frame $g$ rises to free the tool and the stop $q^1$ of the rack $o^1$ comes up against the fixed stop $u^1$ carried by the frame, and the stop then frees the rack $o^1$. The rotatable portion $g^1$ then rotates and assumes the position $f^1$ thus freeing the upper part of the shaft $i$. During this movement of the portion $g^1$ the pinion $k$ rolls on the pinion $l$ which is stationary and the turret head rotates half a revolution, thus substituting the molding tool for the calibrating tool.

In the construction illustrated in Figs. 8 to 17, the machine is furnished with a molding tool $a$ carried by an arm $b^1$ integral with a shaft $c^1$ adapted to rotate on its longitudinal axis. To this end the shaft is mounted in a tubular carrier $d^1$. This carrier may oscillate on trunnions $e^2$ resting on a stationary support $f^1$.

The oscillation of the carrier $d^1$ is controlled by a cam $g^1$ mounted on a cam-shaft $h^1$ and acting upon a roller $i^1$ mounted on the carrier.

The rotary movement of the shaft $c^1$ is obtained by means of a rack $j^1$ which engages with a pinion $k^1$ secured to this shaft. The rack is actuated by a roller $l^1$ in contact with a cam $m^1$ mounted on the cam-shaft.

Contact between the rollers and the cams is assured by means of springs. In the case of the roller $i^1$ the weight of the carrier $d^1$ may be sufficient.

As the cam-shaft rotates the cams $g^1$ and $m^1$ will simultaneously cause the oscillation of the carrier $d^1$ and the rotation of the spindle $c^1$.

The combination of these two movements permits any kind of displacement to be imparted to the molding tool to enable it to follow the outer profile which it is intended to give to the clay while it presses the latter on the mold.

The molding tool may, for example, start at the center and travel toward the periphery of the mold at the same time rising or descending according to the shape to be given to the clay. The position of the molding tool is dependent at each moment upon the contour of the cams which present to this end a suitable profile.

Figs. 11 and 12 illustrate diagrammatically in elevation and plan respectively the positions of the molding arm.

In these figures, $x\ x$ represents, as in Fig. 1, the axis about which the mold $b$ rotates.

The spindle $c^1$ and the arm $b^1$ are at the beginning of the operation in the position $o^1\ b^1\ c^1$.

The spindle $c^1$ then inclines itself as well as its carrier and rotates therein and assumes the position $o^1\ b^2\ c^2$ at the end of the operation. Then the arm continues its movement to free the mold, assuming the position $o^1\ c^3\ b^3$. In this position the automatic stoppage of the device takes place.

Fig. 13 illustrates in profile the projection of the trajectory of the tool on a vertical plane. The positions of the points $b^1\ b^2\ b^3$ correspond to those of the Figs. 11 and 12; at $b^1$ the tool enters into action at the center of the mold; at $b^2$ the work is finished; at $b^3$ stoppage takes place.

It is of course understood that the travel of the tool is variable according to the nature of the articles to be molded.

Figs. 14 and 15 illustrate how the novel arrangement may be applied to an existing lathe.

$p^1$ is an opening in the frame of the machine to allow the passage of the arm $b^1$.

It is to be understood that any kind of tool may be substituted for the ball-shaped tool illustrated in Fig. 8.

Similarly, a gage may be substituted for this molding tool.

The new arrangement may be conveniently mounted on the frame of the lathe at present employed for molding by hand and thus enable manual labor to be superseded by mechanical operation without interfering with existing conditions. But it should be understood that the novel arrangement is applicable to all kinds of lathes other than those above described.

Claims:

1. In a machine for manufacturing plates and like articles, a mold, a molding tool, a gaging tool, a turret head carrying these two tools for bringing them successively into contact with the clay, a spring-operated rack, gears between said rack and the turret head, and a device for setting said rack.

2. In a machine for manufacturing plates and like articles, a mold, a molding tool, a gaging tool, a turret head carrying these two tools for bringing them successively into contact with the clay, a rotary carrier for the turret head, and a sliding frame having a vertical movement and on which is mounted the rotary carrier.

3. In a machine for manufacturing plates and like articles, a mold, a molding tool, a gaging tool, a turret head carrying these two tools for bringing them successively into contact with the clay, a rotary carrier for the turret head, a spring-operated rack actuated by said carrier, and a device for setting said rack.

4. In a machine for manufacturing plates and like articles, a rotary mold, a molding tool, a gaging tool, a turret head carrying the said tools for bringing them successively into contact with the clay on the mold, a frame carrying the said turret head and tools, a spring operated rack slidably mounted in said frame, gear means interposed between the said rack and the turret head, a stop member carried by said rack, and a pivoted stop member mounted on the frame for setting said rack.

5. In a machine for manufacturing plates and like articles, comprising a rotary mold, a vertically slidable frame, a turret head carrying molding and gaging tools and mounted on said frame, a spring operated rack slidably mounted in said frame, gears between said rack and the turret head, means for setting the rack, and means for releasing the same said releasing means including a pivoted stop member carried by the frame and a cam adapted to contact with said pivoted stop.

The foregoing specification of my improved method of and apparatus for manufacturing earthenware plates, dishes and like articles, signed by me this 13th day of February, 1914.

JEAN MARIE ANDRÉ FAURE.

Witnesses:
A. C. GLOSSOP,
JOHN J. ERNSTER.

Copies of this patent may be obtained for five cents each, by addressing the "Commissioner of Patents, Washington, D. C."